March 28, 1933.     J. ZUBATY     1,902,931

PRESSURE GAUGE

Filed Sept. 20, 1928

Inventor

Joseph Zubaty

By Blackmore, Spencer & Flint

Attorneys

Patented Mar. 28, 1933

1,902,931

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

PRESSURE GAUGE

Application filed September 20, 1928. Serial No. 307,068.

This invention relates to gauges of the Bourdon tube type and has particular reference to the mounting of the Bourdon tube and the elimination of the usual socket used to mount the Bourdon tube in the casing.

In prior constructions a socket has been mounted in a frame or base plate and has extended within the casing and the Bourdon tube mounted in a slot or recess in the socket end. The pressure transmitting or capillary tube has been connected to the outer portion of the socket.

It is the object of the present invention to eliminate the socket by connecting the Bourdon tube directly to the pressure transmitting tube.

The object of the invention is accomplished by forming on the frame or plate which supports the gauge operating mechanism an annular flange or stud in which the pressure transmitting tube is mounted. This tube extends somewhat within the casing and is slotted or spread apart at its end. In the slotted portion the closed or stationary end of the Bourdon tube is mounted. All the joints are preferably rigidly held together by means of solder.

The pressure or capillary tube may run directly from the gauge to the medium the pressure of which is to be measured, or if desired it may end a short distance beyond the casing and a coupling member applied.

Referring to the drawing.

Figure 1:
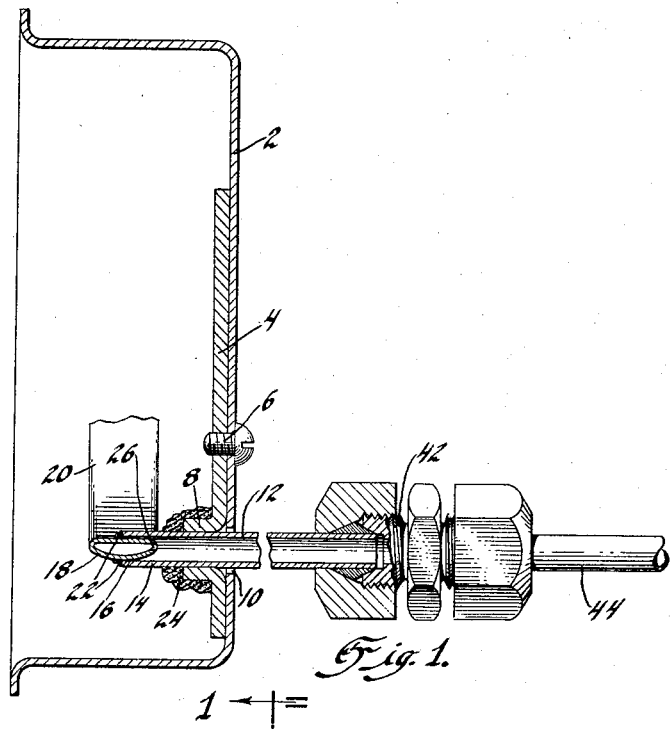
Fig. 1 is a partial sectional view on the line 1—1 of Fig. 2 through a Bourdon tube gauge showing the invention applied thereto.
Figure 2:
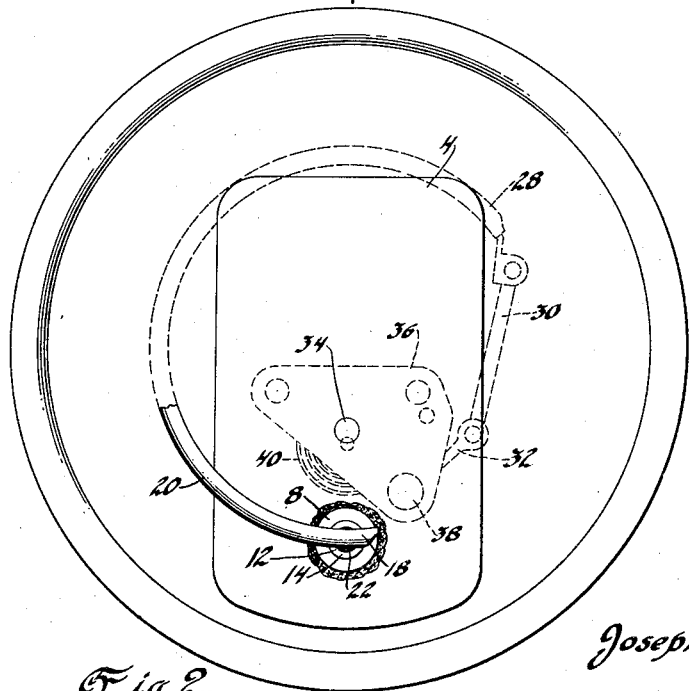
Fig. 2 is an elevational view of the structure of Fig. 1, looking into the casing.

Referring to the drawing the numeral 2 indicates the usual casing and 4 the frame or plate mounted in the bottom thereof and rigidly secured thereto by means of screws 6, one or more of which may be used.

The frame 4 has formed thereon the stud or annular flange 8 which preferably projects inwardly of the casing.

Extending through an opening 10 in the casing and mounted in the stud or annular flange 8 is the pressure transmitting or capillary tube 12 the inner end 14 of which is spread apart or slotted as shown at 16. In the slot 16 the end 18 of the Bourdon tube 20 is mounted and secured by soldering as shown at 22. Solder 24 is also applied to secure the tube 12 in the stud 8.

The Bourdon tube is provided with an opening 26 to permit access from the capillary tube to the interior of the Bourdon tube. The end 18 of the Bourdon tube 20 is closed in the usual manner.

The free end 28 of the Bourdon tube is connected by means of the link 30 to an arm or a sector member 32. The sector member meshes with the usual gear secured to a shaft 34 mounted in the frame 4 and a plate 36 secured to the frame by means of a suitable pillar or pillars 38. A hair spring 40 is provided to throw the pointer to its zero position, the pointer being mounted on the end of the shaft 34.

The capillary tube 12 projects without the casing 2 and may be provided with a coupling member 42 by means of which it is connected to a second pressure tube 44. If desired the coupling 42 may be omitted and the tube 12 extended directly to the medium, the pressure of which is to be measured.

As a result of the invention, it will be observed that there has been eliminated the usual stud or socket in which the Bourdon tube and pressure transmitting tube are mounted and the pressure transmitting tube and Bourdon tube directly connected to each other. This results in a much simpler and cheaper construction, one which is easily assembled and is composed of fewer parts.

In case the tube 12 is of excessive length, and it is found impractical to drill the hole 26, the drill may be passed through both sides of the Bourdon tube and the outer hole soldered shut.

I claim:

1. In a gauge, a casing, a frame or plate mounted in said casing, an integral projection on said frame or plate extending inwardly of said casing, a pressure transmitting tube in said projection, a heavy soldered connection rigidly securing said tube in said projection the solder extending entirely over the projection, and a Bourdon tube having a portion thereof mounted in said pressure tube.

2. In a gauge, a casing, a frame rigidly mounted in said casing, a pressure transmitting tube of uniform cross section rigidly mounted in said frame, said tube having a slotted end, and a Bourdon tube mounted in said slotted end.

3. In a gauge, a casing, a frame rigidly secured in said casing, an integral projection on said frame extending inwardly of said casing, a pressure tube of uniform cross section rigidly mounted in said projection and extending a short distance into said casing, and a Bourdon tube having a portion thereof mounted directly in said pressure tube and extending at right angles thereto.

4. In a gauge, a casing, a frame mounted in said casing, an integral projection on said frame extending inwardly of said casing, a pressure transmitting tube of uniform cross section in said projection and extending a short way into said casing, a soldered connection between said tube and projection extending entirely over said projection, and a Bourdon tube having a portion thereof mounted directly in said pressure tube and extending at right angles thereto.

In testimony whereof I affix my signature.

JOSEPH ZUBATY.